United States Patent
Sgatti et al.

(10) Patent No.: US 8,474,308 B2
(45) Date of Patent: Jul. 2, 2013

(54) METHOD OF MICROPHONE SIGNAL CONTROLLING AN INTERNAL COMBUSTION ENGINE

(75) Inventors: Stefano Sgatti, Imola (IT); Nicolò Cavina, Bologna (IT); Filippo Cavanna, Bologna (IT); Giancarlo Bisanti, Gagliano Del Capo (IT)

(73) Assignee: Magneti Marelli S.p.A., Corbetta (IT)

( * ) Notice: Subject to any disclaimer, the term of this patent is extended or adjusted under 35 U.S.C. 154(b) by 924 days.

(21) Appl. No.: 12/603,220

(22) Filed: Oct. 21, 2009

(65) Prior Publication Data

US 2010/0106393 A1  Apr. 29, 2010

(30) Foreign Application Priority Data

Oct. 21, 2008  (EP) .................................... 08425681

(51) Int. Cl.
*G01M 15/05*  (2006.01)

(52) U.S. Cl.
USPC ...................................................... 73/114.07

(58) Field of Classification Search
USPC .................. 73/35.07, 35.09, 114.02, 114.07, 73/114.26, 114.27
See application file for complete search history.

(56) References Cited

U.S. PATENT DOCUMENTS

| 2002/0097882 A1 | 7/2002 | Greenberg et al. |
| 2011/0166766 A1* | 7/2011 | Panciroli et al. .............. 701/102 |

FOREIGN PATENT DOCUMENTS

| EP | 1843024 | 10/2007 |
| GB | 1529364 | 10/1978 |
| GB | 2228795 | 2/1990 |

OTHER PUBLICATIONS

European Search Report from EP08425681 dated Apr. 28, 2009.

* cited by examiner

*Primary Examiner* — Eric S McCall
(74) *Attorney, Agent, or Firm* — Venable LLP; Robert Kinberg

(57) ABSTRACT

A method of controlling an internal combustion engine having at least one cylinder defining a variable-volume combustion chamber; and a rotating crankshaft powered by a piston sliding inside the cylinder; the control method including the steps of: determining a recording window expressed in engine angle degrees and having a start engine angle and a stop engine angle; acquiring and memorizing the intensity of sound pressure waves, generated by the internal combustion engine as a function of an engine angle, by means of at least one sound pressure sensor and within the recording window; and estimating the value of at least one operating parameter of a part of the internal combustion engine by analysing the intensity of the sound pressure waves in the recording window.

15 Claims, 6 Drawing Sheets

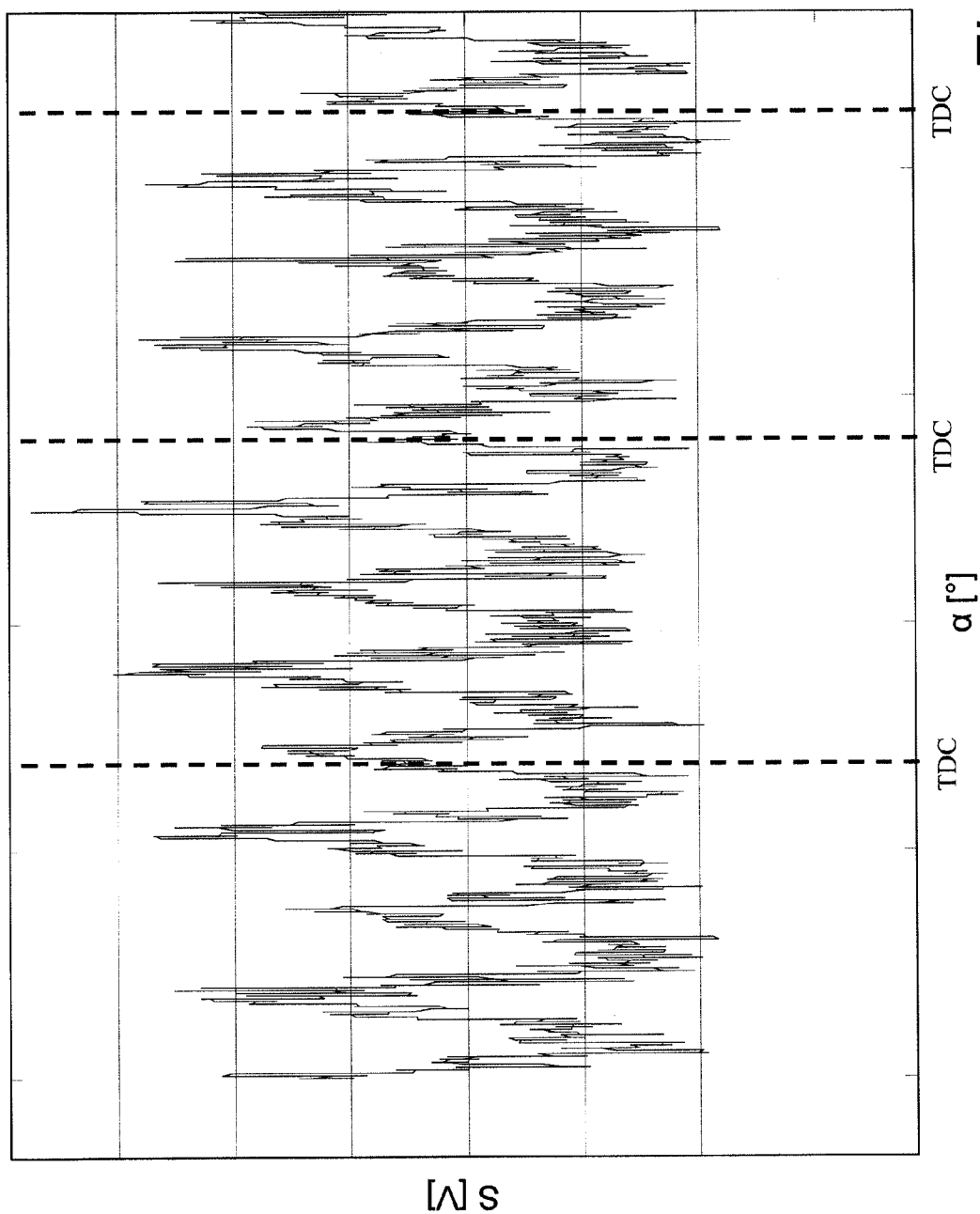

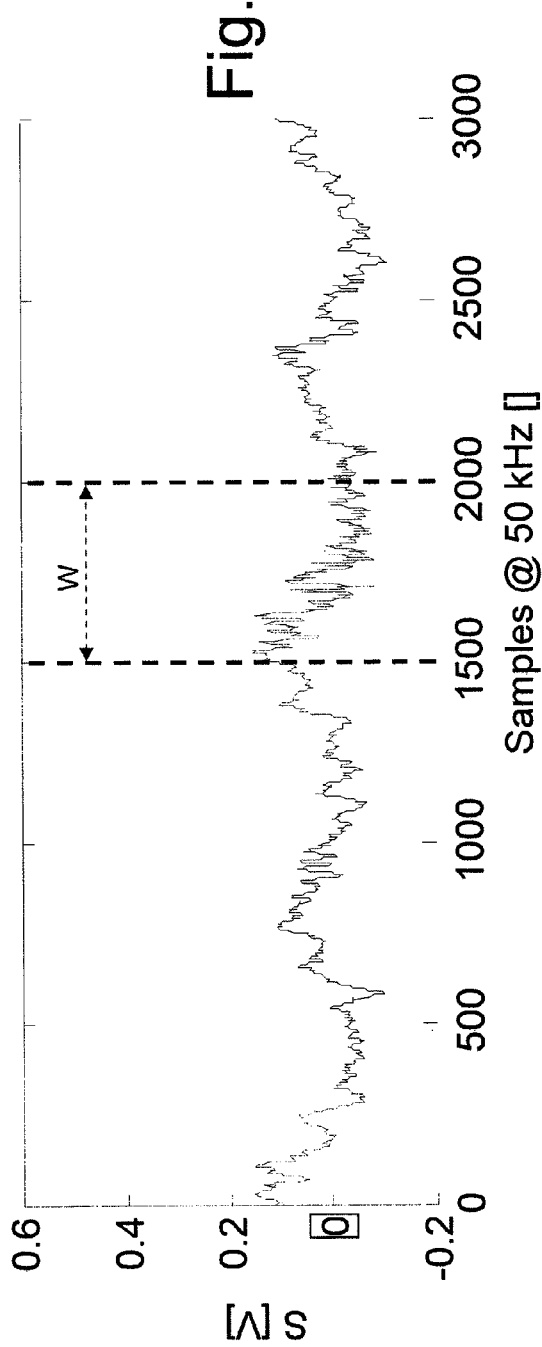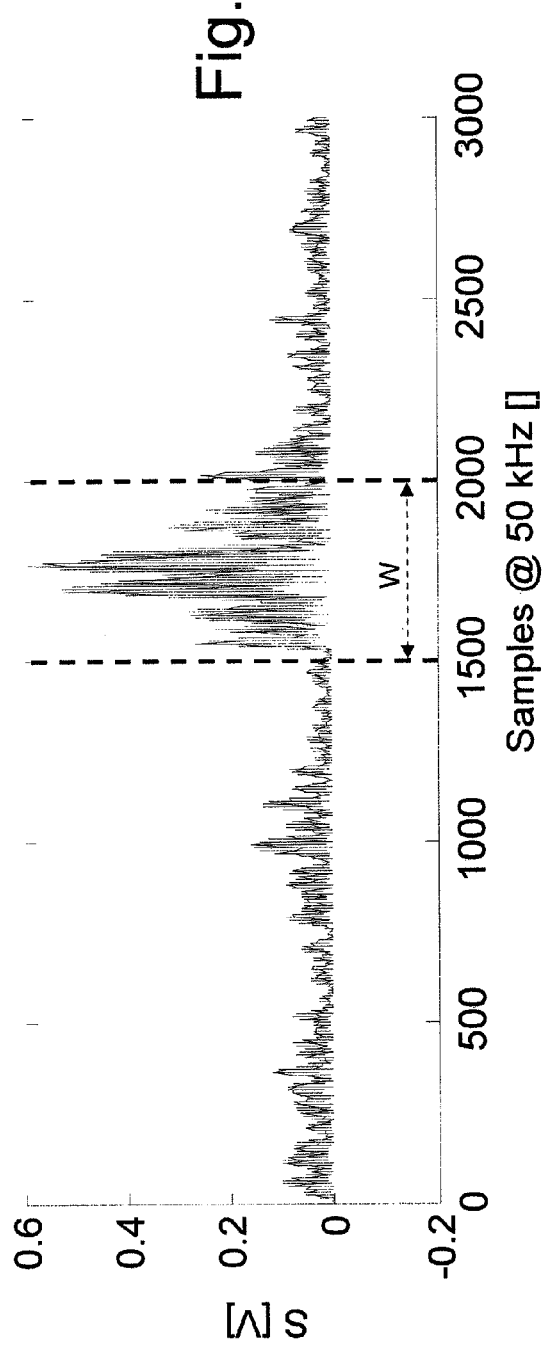

METHOD OF MICROPHONE SIGNAL CONTROLLING AN INTERNAL COMBUSTION ENGINE

This application claims priority of European Patent Application No. 08425681.7 filed Oct. 21, 2008, herein incorporated by reference in its entirety.

TECHNICAL FIELD

The present invention relates to a method of controlling an internal combustion engine.

BACKGROUND ART

Currently marketed internal combustion engines are monitored cyclically to determine combustion characteristics (e.g. engine knock or misfiring) and so adjust combustion parameters (e.g. spark lead), and also to detect any faults and indicate the need for repair. Monitoring is normally based on signals from sensors inside the engine. For example, engine knock is normally determined using a signal from an accelerometer fixed to the crankcase or cylinder head of the engine.

Using sensors installed inside the engine is fairly expensive in terms of purchase cost and installation of the sensors, and the wiring required to connect the sensors physically to an electronic control unit.

Patent Application EP1843024A1 proposes determining the intensity of sound pressure waves generated by an internal combustion engine using a sound pressure sensor (i.e. a microphone), and determining the value of at least one engine operating parameter accordingly. In other words, Patent Application EP1843024A1 proposes replacing traditional sensors, installed inside the engine, with a microphone for determining the sound pressure waves generated by the engine, and which can be integrated directly in the electronic control unit with no further wiring needed.

Patent Application EP1843024A1, however, proposes processing the microphone signal in the same way as a conventional sensor (e.g. accelerometer) signal, without taking into account the characteristics of the sound pressure waves generated by the engine. As a result, the microphone signal analysis findings are invariably inaccurate.

DISCLOSURE OF THE INVENTION

It is an object of the present invention to provide an internal combustion engine control method designed to eliminate the above drawbacks, and which is cheap and easy to implement.

According to the present invention, there is provided an internal combustion engine control method as claimed in the attached Claims.

BRIEF DESCRIPTION OF THE DRAWINGS

A non-limiting embodiment of the present invention will be described by way of example with reference to the accompanying drawings, in which:

FIG. 4 shows a graph illustrating the variation in intensity of the sound pressure waves generated by the internal combustion engine as a function of the engine angle;

FIG. 5 shows two graphs of sound pressure wave intensity before and after band-pass filtering;

PREFERRED EMBODIMENTS OF THE INVENTION

Figure 1:
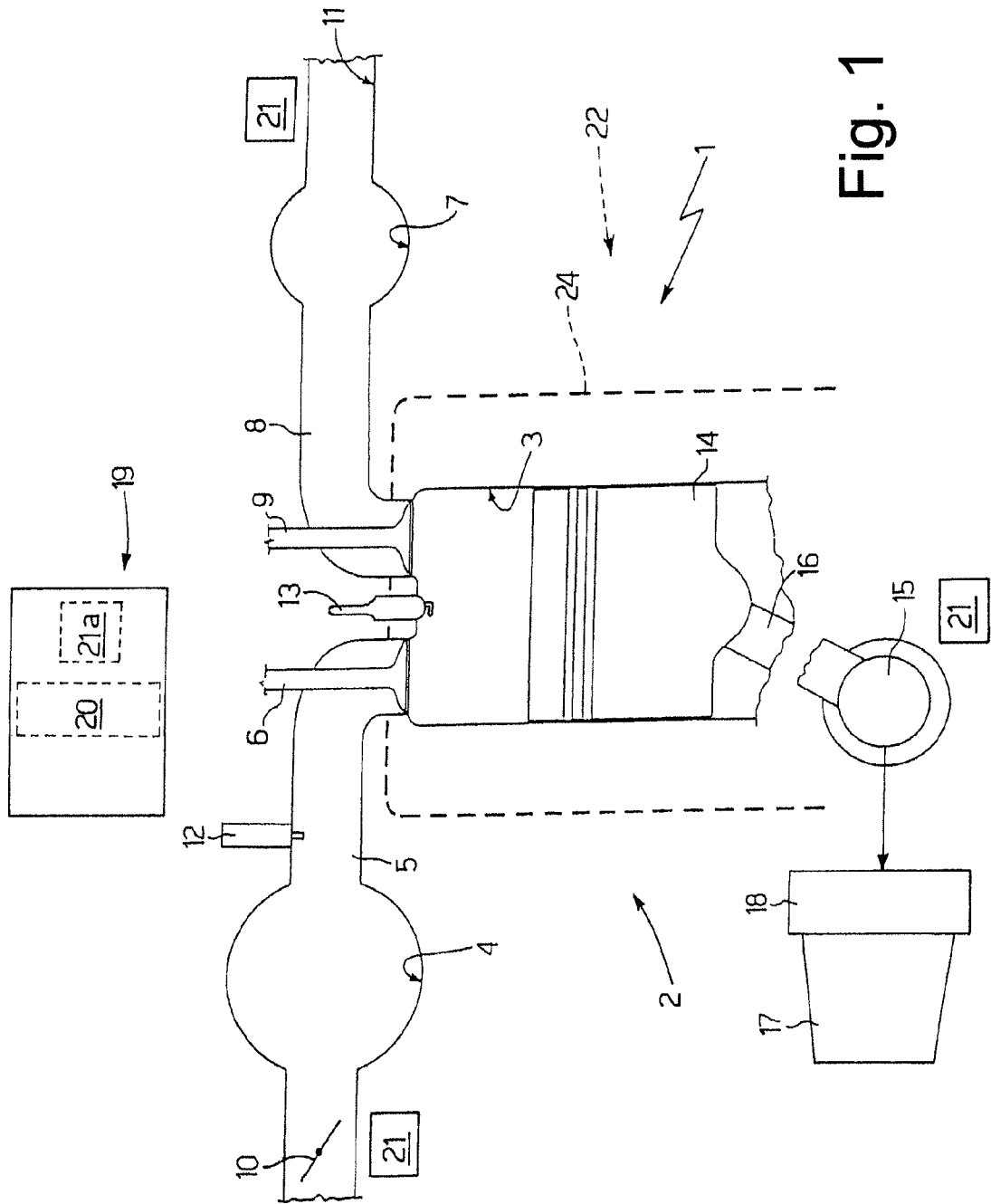
FIG. 1 shows a schematic of an internal combustion engine implementing the control method according to the present invention.

Number 1 in FIG. 1 indicates as a whole a power unit of a road vehicle (not shown).

Power unit 1 comprises a controlled-ignition, Otto cycle, internal combustion engine 2 (i.e. fuelled with petrol or similar). Internal combustion engine 2 comprises four cylinders 3 (only one shown in FIG. 1) defining respective variable-volume chambers, and each of which is connected to an intake manifold 4 by an intake pipe 5 controlled by at least one intake valve 6, and is connected to an exhaust manifold 7 by an exhaust pipe 8 controlled by at least one exhaust valve 9.

Intake manifold 4 is supplied with fresh (i.e. outside) air by a throttle valve 10 adjustable between a closed position and a fully-open position. Exhaust manifold 7 is connected to an exhaust system 11 comprising one or more catalysts (not shown) for expelling the combustion gases produced in cylinders 3. A turbosupercharger (not shown) may be provided downstream from exhaust manifold 7 and upstream from intake manifold 4, and which uses the energy of the exhaust gases to increase air intake speed and pressure to intake manifold 4.

Four injectors 12 (one for each cylinder 3) are fitted to intake pipes 5 to inject petrol cyclically into intake pipes 5 (alternatively, injectors 12 may inject directly into cylinders 3); and four spark plugs 13 (one for each cylinder 3) are fitted to cylinders 3 to cyclically ignite the mixture inside cylinders 3.

Each cylinder 3 has a piston 14 which slides straight along cylinder 3 and is connected mechanically to a crankshaft 15 by a connecting rod 16. Crankshaft 15 is in turn connected mechanically to a gearbox 17 via a clutch 18 to transmit drive torque to the drive wheels of the vehicle (not shown).

Power unit 1 comprises a control system 19 for monitoring operation of power unit 1, and which comprises at least one electronic control unit (ECU) which monitors operation of power unit 1, is located close to engine 2, and is normally housed in the vehicle engine compartment (not shown). Control system 19 also comprises a number of sensors 21 connected to control unit 20 and for measuring various operating parameters of power unit 1 (e.g. the angle and rotation speed of crankshaft 15) which are used by control unit 20 to control power unit 1.

Figure 2:
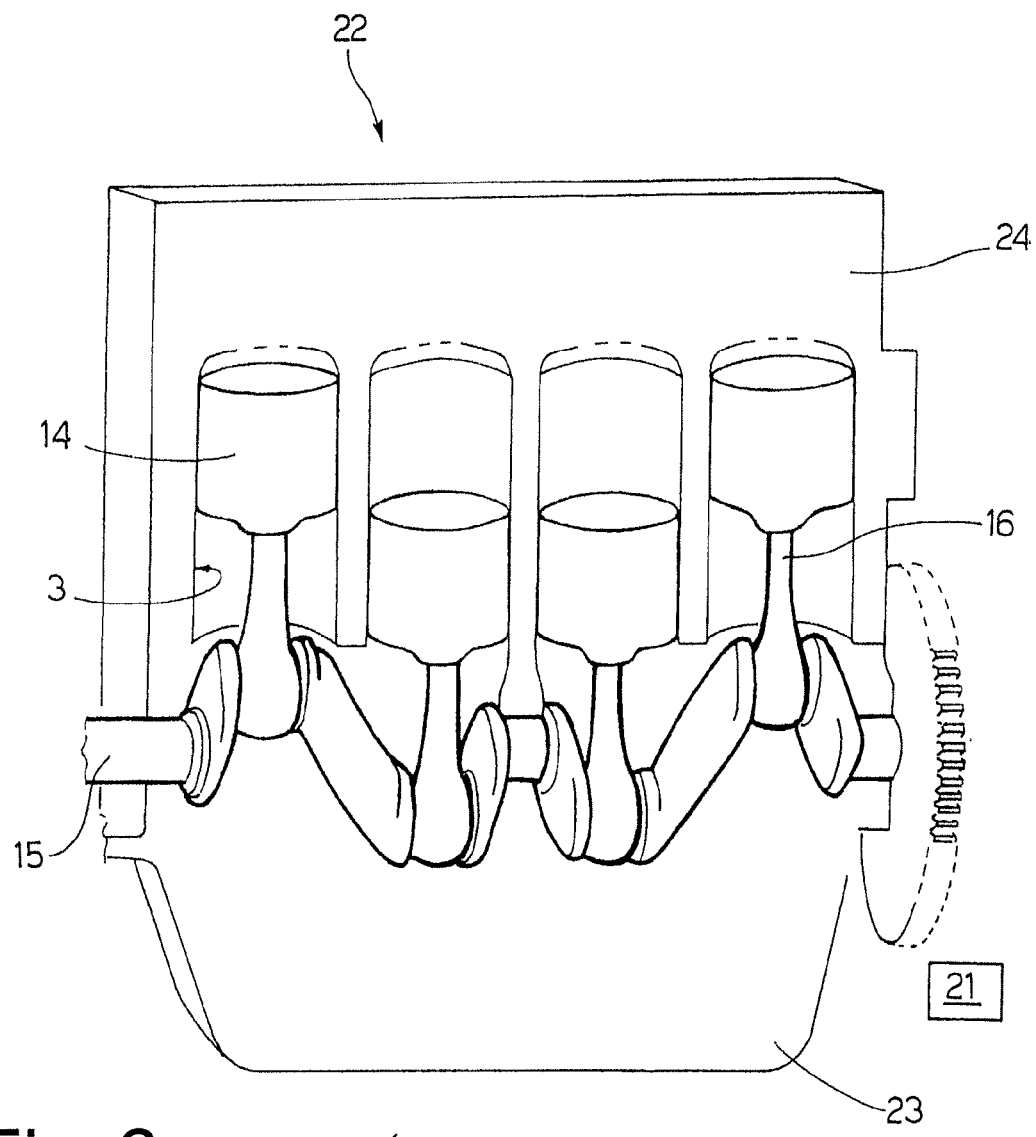
FIG. 2 shows a schematic view in perspective, with parts removed for clarity, of an internal combustion engine of the FIG. 1 power unit.

As shown in FIG. 2, internal combustion engine 2 comprises an engine block 22 housing the rotating parts and comprising a crankcase 23, and a cylinder head 24 in which the four cylinders 3 are formed. Control unit 20 is normally located inside the engine compartment, close to engine block 22, and is physically separate from engine block 22.

Spark plug 13 of each cylinder 3 is controlled cyclically by control unit 20 to produce a spark between its electrodes and so ignite the compressed gas inside cylinder 3. Control unit 20 comprises a memory in which maps are stored containing the control values of spark plugs 13 as a function of the current engine angle. More specifically, for each spark plug 13, the maps contain the spark lead, i.e. the angular interval between ignition, i.e. the spark between the electrodes of spark plug 13, and the top dead-centre or TDC position of piston 14. If the spark lead is zero, this means ignition, i.e. the spark between the electrodes of spark plug 13, occurs exactly at the top dead-centre or TDC position of piston 14.

The spark lead values in the control unit maps are determined at the design stage to ensure good combustion in all operating conditions and hence good thermal efficiency of internal combustion engine 2, while at the same time protecting the integrity of internal combustion engine 2, i.e. preventing excessive knock inside cylinders 3. Combustion, however, is affected by numerous factors, foremost of which are fuel characteristics, the temperature of cylinder head 24, and wear of spark plugs 13, and since the effect of these is practically impossible to predict to any degree of certainly, an estimated knock index $I_d$ is required. In the event of severe knock in cylinders 3, control unit 20 reduces the spark lead value with respect to the map value, so as to eliminate or reduce knock.

Control unit 20 controlling spark plugs 13 uses the spark lead value in the memorized maps, and reduces it in the event of severe knock in the cylinders. This is a protective control strategy that merely serves to safeguard the integrity of internal combustion engine 2 by altering the map-indicated spark lead value in the event of knock in cylinders 3. It has recently been observed, however, that a small amount of knock is not always undesirable, and in some cases may even improve combustion and so maximize thermal efficiency without harming the integrity of internal combustion engine 2. A more aggressive spark lead control strategy has therefore been proposed whereby the map-indicated spark lead value is not only modified in the event of severe knock, but also to achieve a small amount of knock to improve combustion in cylinders 3.

As shown in FIGS. 1 and 2, at least one sound pressure sensor (i.e. microphone) 21a is housed inside control unit 20 (and therefore physically separate from engine block 22) to determine the intensity of sound pressure waves generated by power unit 1. In a different embodiment not shown, sound pressure sensor 21a may be located elsewhere, e.g. in a device controlling throttle valve 10, on intake manifold 4, on a bracket inside the engine compartment, on the vehicle frame, or (less likely) in the vehicle interior. Sound pressure sensor 21a is preferably located inside control unit 20, however, to eliminate assembly work and additional wiring.

Sound pressure sensor 21a may be either omnidirectional or directional, in which latter case, it must obviously be oriented facing engine block 22.

Control based on a sound signal from sound pressure sensor 21a can be developed for any number of purposes. From point analyses, algorithms can be developed which also provide for adaptive evaluations to reliably deduce ageing and drift of the engine-sensor system. The quantities about which information can be obtained from high-frequency (typically about 50 kHz) acquisition and appropriate analysis of the sound signal from sound pressure sensor 21a are:
  knock in each cylinder 3;
  timing and closing speed of valves 6 and/or 9 (especially important in systems with no camshaft, or with some degree of freedom in the mechanical valve lift movement, by enabling the development of algorithms to compensate for actuator errors, possibly with adaptive control);
  misfiring in each cylinder 3;
  injection in each cylinder 3;
  mixture ignition in each cylinder 3;
  actual indicated mean pressure in each cylinder 3;
  combustion start time in each cylinder 3;
  pressure peak position and pressure gradient in each cylinder 3;
  heat release pattern in each cylinder 3;
  operation of auxiliary devices (e.g. fuel pump, injection system pressure regulator . . . );
  faulty mechanical parts (e.g. belts, pulleys, crank gear parts, piston-cylinder connection, injectors 12) even using a predictive approach.

By way of example, the method of processing and analysing the signal from sound pressure sensor 21a to determine a knock index $I_d$ is described below with reference to one cylinder 3 of internal combustion engine 2, and one cycle (in particular, the combustion stroke) of cylinder 3.

Figure 3:
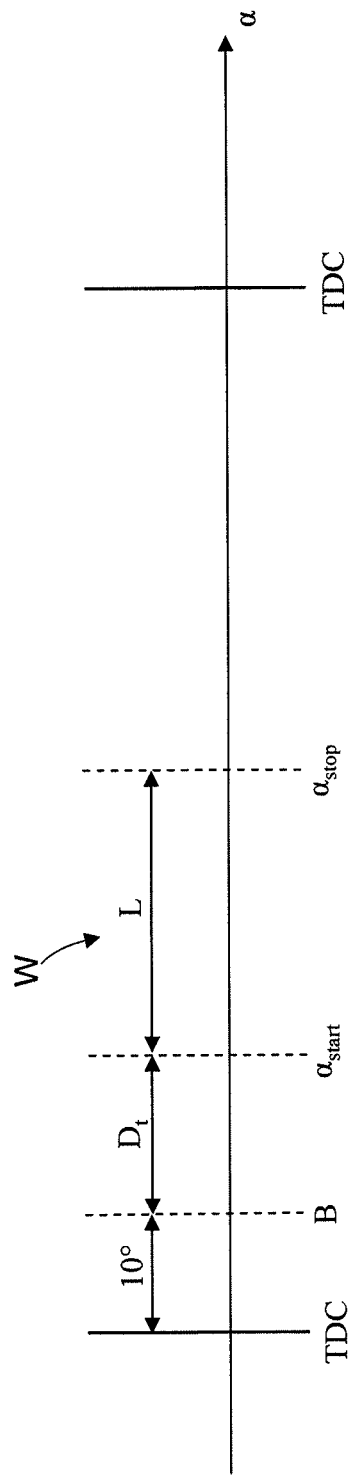
FIG. 3 shows a diagram of how to calculate a recording window employed in the control method according to the present invention.

As shown in FIG. 3, to determine the knock index $I_d$ of cylinder 3, a recording window W must be determined, expressed in engine angle degrees and having a start engine angle $\alpha_{start}$ and a stop engine angle $\alpha_{stop}$. In the course of the cylinder 3 cycle, the intensity S of the sound pressure waves generated by internal combustion engine 2 as a function of engine angle $\alpha$ is recorded by sound pressure sensor 21a in recording window W and memorized in a buffer memory. Sound pressure wave intensity S is acquired by relatively high-frequency, e.g. about 50 kHz, sampling. The FIG. 4 graph shows an example of the variation in intensity S of the sound pressure waves generated by internal combustion engine 2 as a function of engine angle $\alpha$. Finally, knock index $I_d$ is estimated by analysing sound pressure wave intensity S in recording window W.

At the design stage, a distance d, at which to estimate knock index $I_d$, is determined between sound pressure sensor 21a and cylinder 3 (i.e. between sound pressure sensor 21a and the part of internal combustion engine 2 to which the operating parameter for assessment refers). Using distance d and the rotation speed $\omega$ of crankshaft 15, a transmission delay $D_t$ is calculated, expressed in engine degrees and indicating the delay with which sound pressure sensor 21a senses the intensity S of the sound pressure waves generated in internal combustion engine 2 by the phenomenon being investigated (in this case, combustion in cylinder 3). Using transmission delay $D_t$, the start engine angle $\alpha_{start}$ and stop engine angle $\alpha_{stop}$ of recording window W are calculated.

Transmission delay $D_t$, expressed in engine degrees, is preferably calculated using the equation:

$$D_t = \frac{d * \omega * 360}{V_{sound} * 60}$$

where:
  $D_t$ (°) is the transmission delay expressed in engine degrees;
  d (m) is the distance between sound pressure sensor 21a and the part of internal combustion engine 2 to which the operating parameter for assessment refers;
  $\omega$ (rpm) is the rotation speed of crankshaft 15;
  $V_{sound}$ (m/s) is the speed of sound in air.

At the design stage, a start time B and a duration L, both expressed in engine degrees, are determined of the combustion phenomenon in cylinder 3, with particular reference to the onset of engine knock (i.e. the phenomenon synthesized by the operating parameter for assessment, which is knock index $I_d$). The start engine angle $\alpha_{start}$ of recording window W is calculated by adding transmission delay $D_t$, expressed in engine degrees, to start time B, and the stop engine angle $\alpha_{stop}$ of recording window W is calculated by adding duration L, expressed in engine degrees, to start engine angle $\alpha_{start}$ of recording window W. In other words:

$$\alpha_{start} = B + D_t$$

$$\alpha_{stop} = \alpha_{start} + L$$

where:
$\alpha_{start}$ (°) is the start engine angle of recording window W;
$\alpha_{stop}$ (°) is the stop engine angle of recording window W;
B (°) is the start time, expressed in engine degrees, of the combustion phenomenon in cylinder 3, with particular reference to the onset of knock;
$D_t$ (°) is the transmission delay expressed in engine degrees;
L (°) is the duration, expressed in engine degrees, of the combustion phenomenon in cylinder 3, with particular reference to the onset of knock.

In the case in question—assessing knock index $I_d$—start time B, expressed in engine degrees, equals or lags slightly (by roughly 5-15° and typically 10°) with respect to the TDC position of cylinder 3; and duration L, expressed in engine degrees, is normally less than the angular distance between two consecutive combustions, and, for a four-stroke, four-cylinder internal combustion engine with equally spaced combustions (of the type shown in FIGS. 1 and 2), ranges between 120° and 160° and is typically 140°. The 10° delay with respect to the TDC position of cylinder 3 is justified on the grounds that high-frequency fluctuations in the knock-related pressure signals occur not at but roughly 10° after the TDC position. To eliminate noise relating to other than combustion phenomena, duration L, expressed in engine degrees, is best selected as short as possible, to analyse only the information-rich part of the signal.

Once intensity S of the sound pressure waves generated by internal combustion engine 2 as a function of engine angle $\alpha$ within recording window W is memorized, intensity S of the sound pressure waves in recording window W is filtered. Filtering is at least high-pass (with a roughly 5 kHz cutoff frequency) and preferably band-pass (with a passband typically ranging between 5 kHz and 15 kHz) In a different embodiment, band-pass filtering may have a 6-8.5 kHz passband, or three passbands ranging between 5 and 7 kHz, 9 and 11 kHz, and 13 and 15 kHz. To eliminate noise relating to other than combustion phenomena, as narrow a passband as possible is best selected to analyse only the information-rich part of the signal.

FIG. 5, for example, shows two graphs illustrating sound pressure wave intensity S before (FIG. 5a) and after (FIG. 5b) band-pass filtering.

Knock index $I_d$ is calculated using the filtered intensity S of the sound pressure waves in recording window W, and can be calculated using various mathematical formulae, each of which has pros and cons.

In a preferred embodiment, knock index $I_d$ is the mean filtered intensity S of the sound pressure waves in recording window W. In other words:

$$I_d = \frac{\sum_{i=1}^{n} |S_i|}{n}$$

where:
$I_d$ is the knock index;
n is the number of filtered intensity S samples of the sound pressure waves in recording window W;
S is the filtered sound pressure wave intensity.

In an alternative embodiment, knock index $I_d$ is the maximum absolute filtered intensity S of the sound pressure waves in recording window W. In other words:

$$I_d = \max(|S|)$$

where:
$I_d$ is the knock index;
S is the filtered sound pressure wave intensity.

In an alternative embodiment, knock index $I_d$ is the mean of the first derivatives, with respect to engine angle $\alpha$, of filtered intensity S of the sound pressure waves in recording window W. In other words:

$$I_d = \frac{\sum_{i=1}^{n} \left|\frac{dS_i}{d\alpha}\right|}{n}$$

where:
$I_d$ is the knock index;
n is the number of filtered intensity S samples of the sound pressure waves in recording window W;
$\alpha$ is the engine angle;
S is the filtered sound pressure wave intensity.

In an alternative embodiment, knock index $I_d$ is the maximum absolute value of the third derivative, with respect to engine angle $\alpha$, of filtered intensity S of the sound pressure waves in recording window W. In other words:

$$I_d = \max\left(\left|\frac{d^3 S}{d\alpha^3}\right|\right)$$

where:
$I_d$ is the knock index;
n is the number of filtered intensity S samples of the sound pressure waves in recording window W;
$\alpha$ is the engine angle;
S is the filtered sound pressure wave intensity.

For a higher confidence level, knock index $I_d$ may also be calculated using more complex equations, though this has the drawback of increasing the computing load of control unit 20. The filtered intensity S of the sound pressure waves in recording window W may also be analysed using "transformations" to alter the distribution of filtered intensity S (e.g. by means of a logarithmic curve or FFT—Fast Fourier Transform). Obviously, transforms other than FFT (e.g. STFT—Short-Time Fourier Transform or similar) may be used to intercept variations in point phenomena within recording window W.

Figure 6:
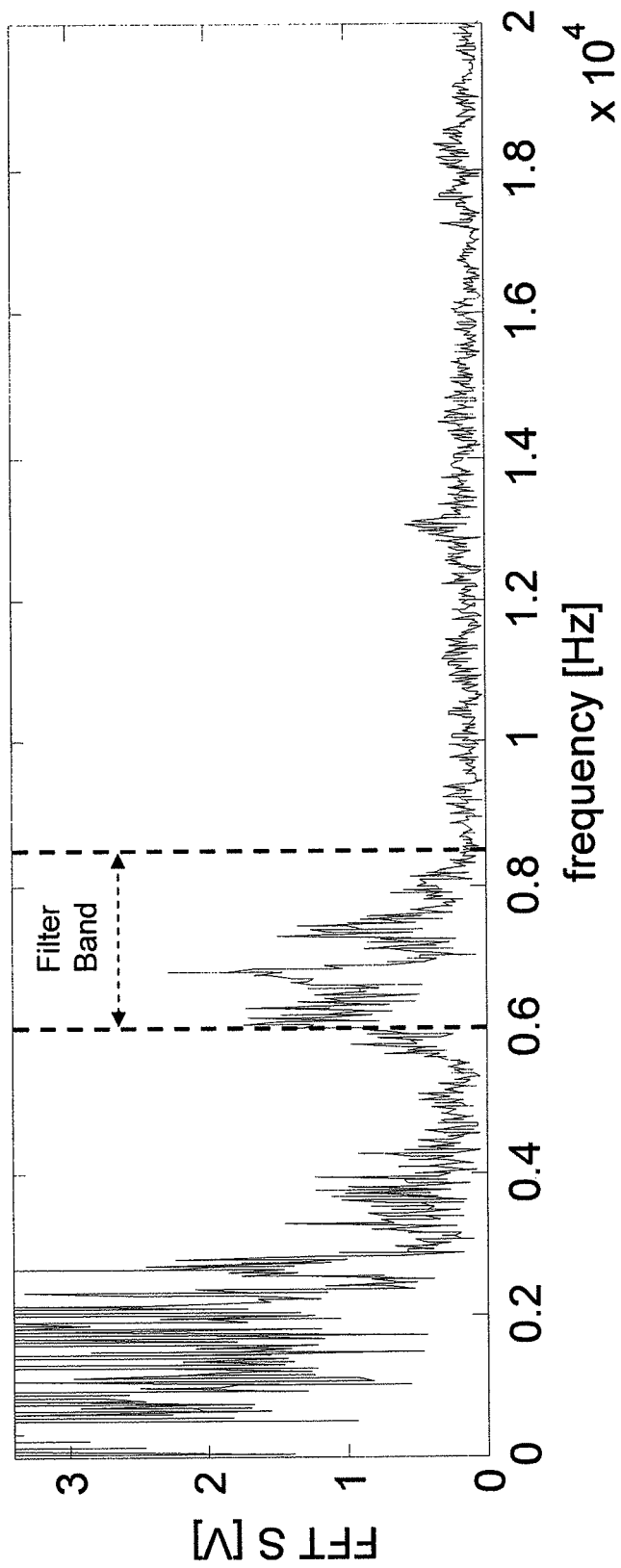
FIG. 6 shows a graph illustrating the FFT of sound pressure wave intensity within the recording window, and the band-pass filter band.

FIG. 6, for example, shows a graph illustrating the FFT of intensity S of the sound pressure waves in recording window W, and the applicable band-pass filter band to analyse only the information-rich part of the signal.

To determine the presence and, possibly, the degree of knock in cylinder 3, at least one threshold value V, with which to compare knock index $I_d$, is determined at the design stage. For example, knock in cylinder 3 may be diagnosed when knock index $I_d$ exceeds threshold value V. Obviously, a number of threshold values V may be established to indicate, for example, no knock, minor acceptable knock, and severe unacceptable knock.

In a preferred embodiment, threshold value V is updated cyclically using a self-teaching technique, which may, for example, comprise setting cylinder 3 (i.e. the part of internal combustion engine 2 to which knock index $I_d$ refers) to a known condition; estimating knock index $I_d$ with cylinder 3 in the known condition; and updating threshold value V if the comparison between knock index $I_d$ and threshold value V is inconsistent with the known condition of cylinder 3. For example, if cylinder 3 is set to a condition (e.g. low-load or release condition) that precludes knock, and the comparison between knock index $I_d$ and threshold value V indicates the presence of knock, this means threshold value V needs updating. Similarly, if cylinder 3 is set to a condition (e.g. high spark lead condition) invariably accompanied by knock, and the comparison between knock index $I_d$ and threshold value V indicates no knock, this also means threshold value V needs updating.

The above relative to estimating knock index $I_d$ also applies to estimating other operating parameters of internal combustion engine 2 parts, such as a misfire index, injection index, or actual indicated mean pressure in each cylinder 3. Obviously, the position and size of recording window W, the filtration mode, the equation used to calculate the operating parameter, and threshold value V must be established case by case.

The above control method of estimating at least one operating parameter of an internal combustion engine part has numerous advantages: it is easy to implement, even in an existing control unit, by not requiring a high degree of computing power; and, above all, provides for accurately estimating the operating parameter to a high confidence level.

The invention claimed is:

1. A method of controlling an internal combustion engine having at least one cylinder defining a variable-volume combustion chamber; and a rotating crankshaft powered by a piston sliding inside the cylinder; the control method comprising the steps of:
   determining a recording window expressed in engine angle degrees and having a start engine angle and a stop engine angle;
   acquiring and memorizing the intensity of sound pressure waves, generated by the internal combustion engine as a function of an engine angle, by means of at least one sound pressure sensor and within the recording window; and
   estimating the value of at least one operating parameter of a part of the internal combustion engine by analysing the intensity of the sound pressure waves in the recording window;
   the control method being characterized by comprising the further steps of:
   determining, at a design stage, a distance between the sound pressure sensor and the part of the internal combustion engine to which the operating parameter for assessment refers;
   calculating a transmission delay, expressed in engine degrees, as a function of a rotation speed of the crankshaft and of the distance between the sound pressure sensor and the part of the internal combustion engine to which the operating parameter for assessment refers; and
   calculating the start engine angle and stop engine angle of the recording window as a function of the transmission delay.

2. A control method as claimed in claim 1, wherein the transmission delay ($D_t$) expressed in engine degrees is calculated using the following equation:

$$D_t = \frac{d * \omega * 360}{v_{sound} * 60}$$

where:
   $D_t$ (°) is the transmission delay expressed in engine degrees;
   d (m) is the distance between the sound pressure sensor and the part of the internal combustion engine to which the operating parameter for assessment refers;
   $\omega$ (rpm) is the rotation speed of the crankshaft;
   $V_{sound}$ (m/s) is the speed of sound in air.

3. A control method as claimed in claim 1, and comprising the further steps of:
   determining, at a design stage, a start time, expressed in engine degrees, of a phenomenon synthesized by the operating parameter for assessment;
   determining, at a design stage, a duration, expressed in engine degrees, of the phenomenon synthesized by the operating parameter for assessment;
   calculating the start engine angle of the recording window by adding the transmission delay, expressed in engine degrees, to the start time, expressed in engine degrees, of the phenomenon synthesized by the operating parameter for assessment; and
   calculating the stop engine angle of the recording window by adding to the start engine angle of the recording window the duration, expressed in engine degrees, of the phenomenon synthesized by the operating parameter for assessment.

4. A control method as claimed in claim 3, wherein, when the operating parameter for assessment is a knock index of a cylinder, the start time expressed in engine degrees is 10° after the TDC position of the cylinder.

5. A control method as claimed in claim 4, wherein the duration expressed in engine degrees is less than the angular distance between two consecutive combustions.

6. A control method as claimed in claim 5, wherein, for a four-stroke, four-cylinder internal combustion engine with equally spaced combustions, the duration expressed in engine degrees ranges between 120° and 160°, and is typically 140°.

7. A control method as claimed in claim 1, wherein the step of estimating the value of the operating parameter comprises the further steps of:
   filtering the intensity of the sound pressure waves in the recording window; and
   calculating the value of the operating parameter using the filtered intensity of the sound pressure waves in the recording window.

8. A control method as claimed in claim 7, wherein, when the operating parameter for assessment is a knock index of a cylinder, filtering is band-pass filtering in a 5 kHz to 15 kHz frequency range.

9. A control method as claimed in claim 7, wherein, when the operating parameter for assessment is a knock index of a cylinder, the knock index is the maximum absolute filtered intensity of the sound pressure waves in the recording window.

10. A control method as claimed in claim 7, wherein, when the operating parameter for assessment is a knock index of a cylinder, the knock index is the mean of the first derivatives, with respect to the engine angle, of the filtered intensity of the sound pressure waves in the recording window.

11. A control method as claimed in claim 7, wherein, when the operating parameter for assessment is a knock index of a cylinder, the knock index is the maximum absolute value of the third derivative, with respect to the engine angle, of the filtered intensity of the sound pressure waves in the recording window.

12. A control method as claimed in claim 7, wherein, when the operating parameter for assessment is a knock index of a cylinder, the knock index is the mean filtered intensity of the sound pressure waves in the recording window.

13. A control method as claimed in claim 1, and comprising the further steps of:
- determining, at a design stage, at least one threshold value with which to compare the value of the operating parameter; and
- comparing the value of the operating parameter with the threshold value.

14. A control method as claimed in claim 13, and comprising the further step of updating the threshold value by means of a self-teaching technique.

15. A control method as claimed in claim 14, wherein the self-teaching technique comprises the steps of:
- setting the part of the internal combustion engine, to which the operating parameter for assessment refers, to a known condition;
- estimating the value of the operating parameter with the part of the internal combustion engine in the known condition;
- updating the threshold value if the comparison between the value of the operating parameter and the threshold value is inconsistent with the known condition of the part of the internal combustion engine to which the operating parameter refers.

* * * * *